(12) United States Patent
Bennett, Jr. et al.

(10) Patent No.: US 9,714,020 B1
(45) Date of Patent: Jul. 25, 2017

(54) HOVERCRAFT ASSEMBLY

(71) Applicants: David Bennett, Jr., Mc Cordsville, IN (US); Pheriba Hawker, Mc Cordsville, IN (US)

(72) Inventors: David Bennett, Jr., Mc Cordsville, IN (US); Pheriba Hawker, Mc Cordsville, IN (US)

( * ) Notice: Subject to any disclaimer, the term of this patent is extended or adjusted under 35 U.S.C. 154(b) by 0 days.

(21) Appl. No.: 15/068,035

(22) Filed: Mar. 11, 2016

(51) Int. Cl.
*B60V 1/15* (2006.01)
*B60V 1/18* (2006.01)
*B60V 1/11* (2006.01)

(52) U.S. Cl.
CPC .............. *B60V 1/15* (2013.01); *B60V 1/11* (2013.01); *B60V 1/18* (2013.01)

(58) Field of Classification Search
CPC .................................. B64C 15/12; B60V 3/08
See application file for complete search history.

(56) References Cited

U.S. PATENT DOCUMENTS

| | | | | |
|---|---|---|---|---|
| 3,141,436 A * | 7/1964 | Cathers | ............... | B60V 1/046 114/280 |
| 3,159,228 A * | 12/1964 | Byrne | ................... | B60V 1/046 180/130 |
| 3,184,183 A * | 5/1965 | Plasecki | ................ | B64C 27/20 244/23 R |
| 3,203,645 A * | 8/1965 | Shaw | ..................... | B60V 1/115 180/129 |
| 3,208,543 A * | 9/1965 | Crowley | ............... | B60V 1/046 114/67 A |
| 3,265,141 A * | 8/1966 | Cossairt | ................... | B60V 1/02 180/130 |
| 3,322,223 A | 5/1967 | Bertelsen | | |
| D243,937 S | 4/1977 | Paretchan | | |
| 4,469,294 A | 9/1984 | Clifton | | |
| 5,141,173 A | 8/1992 | Lay | | |
| 5,454,531 A | 10/1995 | Melkuti | | |
| 5,738,302 A * | 4/1998 | Freeland | ............. | B64C 29/0025 180/116 |
| 6,457,670 B1 | 10/2002 | Geranio et al. | | |
| 7,188,803 B2 * | 3/2007 | Ishiba | ................. | B64C 29/0025 244/23 R |
| 7,249,732 B2 * | 7/2007 | Sanders, Jr. | ............ | B64C 27/12 244/12.1 |
| 7,370,828 B2 | 5/2008 | Stephens | | |
| 8,074,917 B1 * | 12/2011 | Harrison | ................. | B64C 25/32 244/12.1 |

(Continued)

FOREIGN PATENT DOCUMENTS

| | | | | |
|---|---|---|---|---|
| SA | WO 2016142555 A1 * | 9/2016 | ............ | B64C 29/00 |
| WO | WO2005072233 | 8/2005 | | |

*Primary Examiner* — Kevin Hurley

(57) ABSTRACT

A hovercraft assembly includes a vehicle that may be driven. A pair of propulsion units is provided and each of the propulsion units is coupled to the vehicle. Each of the propulsion units may urge air outwardly from the body. Thus, the vehicle may levitate with respect to support surface. Each of the propulsion units may direct the air in a selected direction with respect to the body. Thus, the propulsion units may urge the vehicle along the support surface in a selected direction. Each of the propulsion units is operationally coupled to the handlebars such that the handlebars control operational parameters of each of the propulsion units.

12 Claims, 4 Drawing Sheets

(56) References Cited

U.S. PATENT DOCUMENTS

2006/0225404 A1\* 10/2006 Dev .................. B64C 27/20
                                              60/200.1
2014/0158816 A1\*  6/2014 DeLorean ........... B64C 29/0033
                                              244/12.4

\* cited by examiner

HOVERCRAFT ASSEMBLY

BACKGROUND OF THE DISCLOSURE

Field of the Disclosure

The disclosure relates to hovercraft devices and more particularly pertains to a new hovercraft device for using jet engines to levitate and propel a vehicle.

SUMMARY OF THE DISCLOSURE

An embodiment of the disclosure meets the needs presented above by generally comprising a vehicle that may be driven. A pair of propulsion units is provided and each of the propulsion units is coupled to the vehicle. Each of the propulsion units may urge air outwardly from the body. Thus, the vehicle may levitate with respect to support surface. Each of the propulsion units may direct the air in a selected direction with respect to the body. Thus, the propulsion units may urge the vehicle along the support surface in a selected direction. Each of the propulsion units is operationally coupled to the handlebars such that the handlebars control operational parameters of each of the propulsion units.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
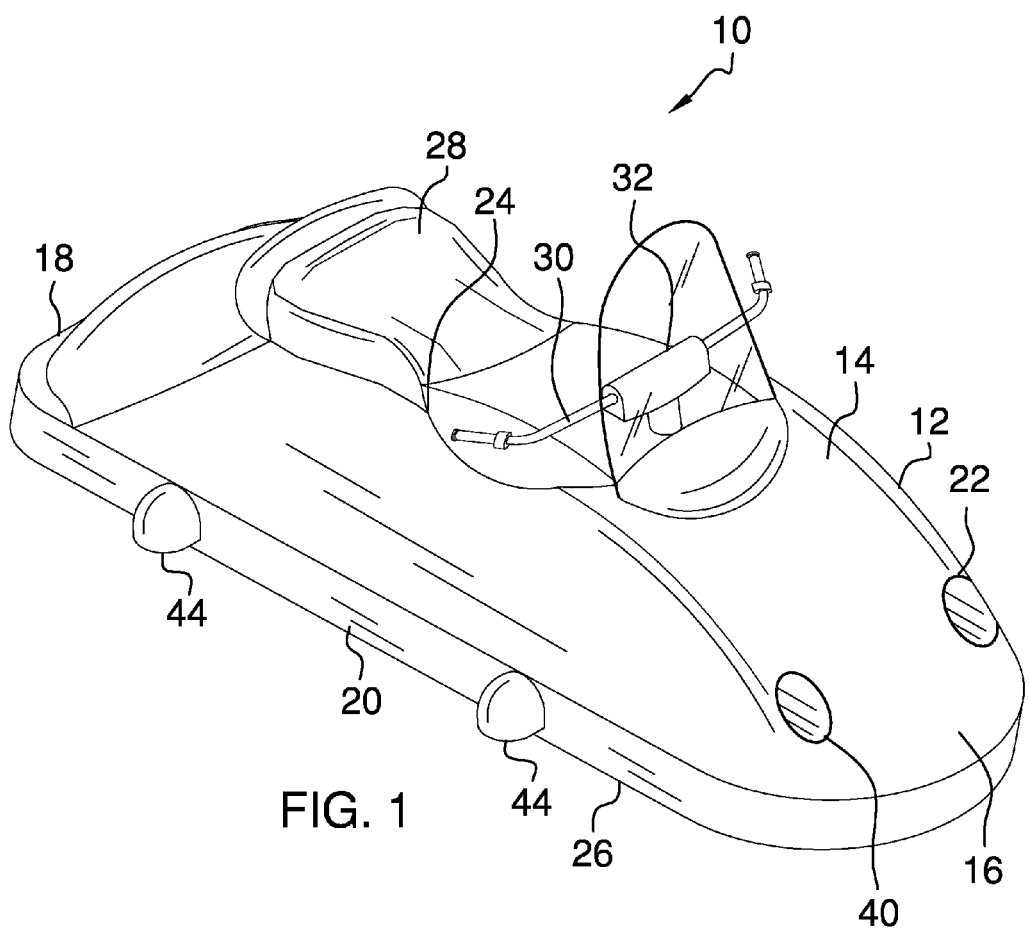
FIG. 1 is a top perspective view of a hovercraft assembly according to an embodiment of the disclosure.
Figure 2:
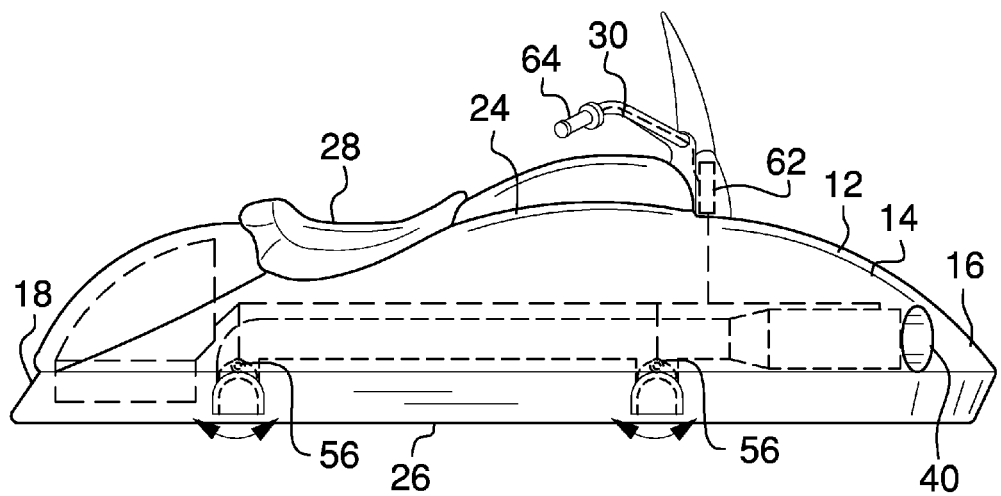
FIG. 2 is a right side phantom view of an embodiment of the disclosure.
Figure 3:
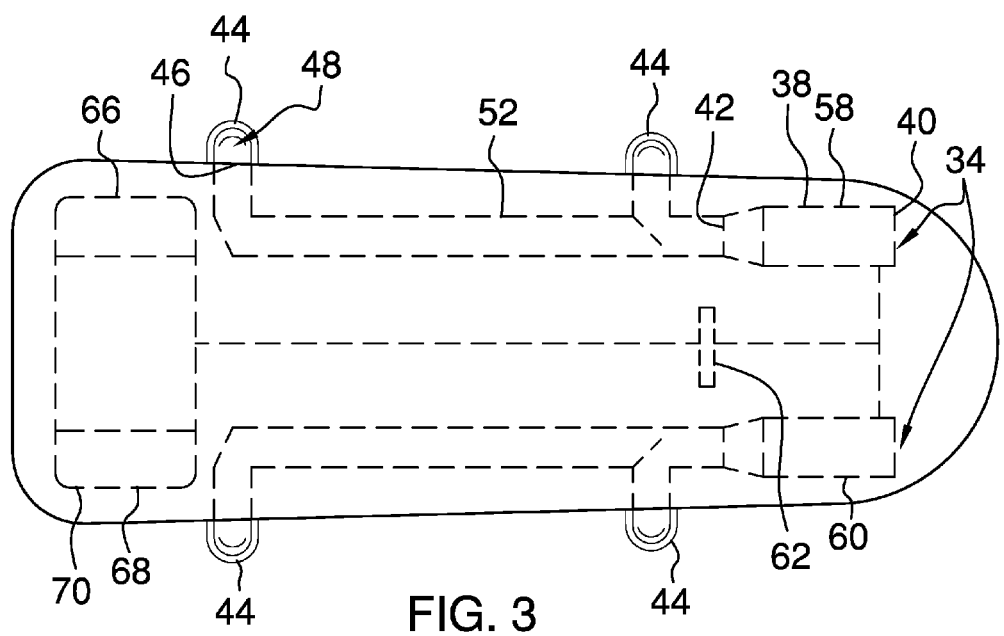
FIG. 3 is a bottom phantom view of an embodiment of the disclosure.
Figure 4:
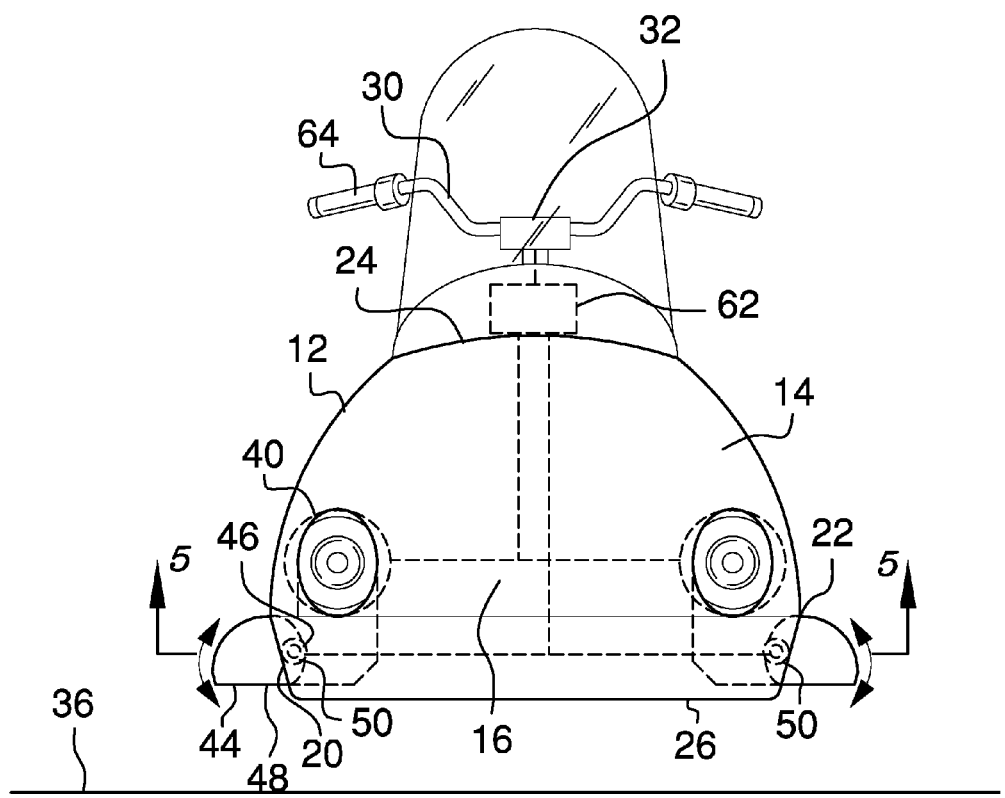
FIG. 4 is a front phantom view of an embodiment of the disclosure.
Figure 5:
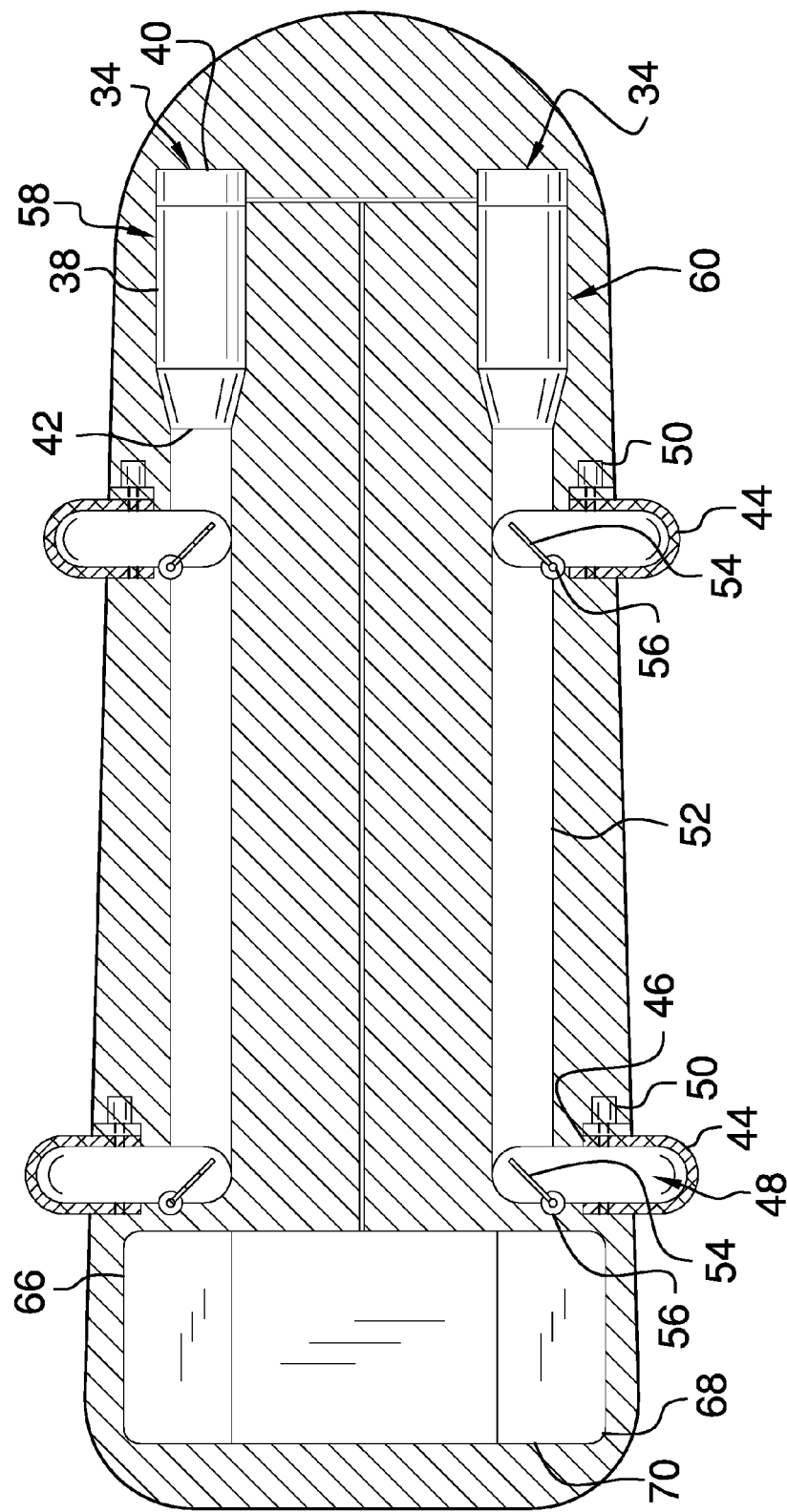
FIG. 5 is a cross sectional view taken along line 5-5 of FIG. 4 of an embodiment of the disclosure.

With reference now to the drawings, and in particular to FIGS. 1 through 5 thereof, a new hovercraft device embodying the principles and concepts of an embodiment of the disclosure and generally designated by the reference numeral 10 will be described.

As best illustrated in FIGS. 1 through 5, the hovercraft assembly 10 generally comprises a vehicle 12 that may be driven. The vehicle 12 includes a body 14. The body 14 has a front end 16, a back end 18, a first lateral side 20, a second lateral side 22, a top side 24 and a bottom side 26. The top side 26 of the body may curve outwardly between the front end 16, the back end 18, the first lateral side 20 and the second lateral side 22. Thus, the vehicle 12 may be substantially dome shaped.

A seat 28 is positioned on the top side 24 of the body 14 and the seat 28 may support a user. A pair of handlebars 30 is coupled to the top side 26 and the pair of handlebars 30 may be gripped. The handlebars 30 are positioned between the seat 28 and the front end 16. The handlebars 30 may be rotatably coupled to the body 14. Thus, the handlebars 30 may be manipulated in the convention of motorcycle handlebars. The handlebars 30 may include an electronic sensor 32 that detects rotational positioning of the handlebars 30 with respect to steering the vehicle 12.

A pair of propulsion units 34 is provided and each of the propulsion units 34 is coupled to the vehicle 12. Each of the propulsion units 34 may urge air outwardly from the body 14 thereby facilitating the vehicle 12 to levitate with respect to a support surface 36. The support surface 36 may comprise ground. Each of the propulsion units 34 may direct the air in a selected direction with respect to the body 14. Thus, each of the propulsion units 34 may urge the vehicle along the support surface 36 in a selected direction. Each of the propulsion units 34 is operationally coupled to the handlebars 30. Thus, the handlebars 30 control operational parameters of each of the propulsion units 34.

Each of the propulsion units 34 comprises a jet engine 38 that has an intake 40 and an exhaust 42. The jet engine 38 is positioned within the body 14 such that intake 40 extends through the front end 16. Thus, the intake 40 may draw air inwardly into the jet engine 38 thereby facilitating the jet engine 38 to urge the air outwardly through the exhaust 42. The jet engine 38 may comprise a micro jet engine or the like.

A pair of nozzles 44 is provided and each of the nozzles 44 is movably coupled to the body. Each of the nozzles 44 has an inlet 46 and an outlet 48. The outlet 48 corresponding to each of the nozzles 44 is movably coupled to the body 14. Each of the nozzles 44 is curved between the inlet 46 and the outlet 48. Thus, the inlet 46 is positioned at an angle with respect to the outlet 48.

A pair of first motors 50 is provided and each of the first motors 50 is coupled to an associated one of the nozzles 44. Each of the first motors 50 selectively rotates the associated nozzle 44 about an axis extending through the first lateral side 20 and the second lateral side 22 of the body. The outlet 48 corresponding to the associated nozzle 44 is selectively directed toward the front end 16 and the back end 18 of the vehicle 12. Thus, each of the first motors 50 facilitates forward and rearward directional control of the vehicle 12.

Each of the first motors 50 selectively rotates the associated nozzle 44 about an axis extending through the top side 24 and the bottom side 26 of the body 14. The outlet 48 corresponding to the associated nozzle 44 is directed in a selected direction. Thus, each of the first motors 50 facilitates lateral directional control of the vehicle 12. Each of the first motors 50 may comprise an electrical motor or the like.

A conduit 52 is fluidly coupled between the jet engine 38 and each of the nozzles 44. Thus, each of the nozzles 44 may have the air urged outwardly through the outlet 48 thereby facilitating each of the nozzles 44 to produce thrust. The conduit 52 may be comprised of a heat resistant material. Thus, the conduit 52 resists being damaged by heat from the jet engine 38.

A pair of dampers 54 is provided and each of the dampers 54 is hingedly coupled to the conduit 52. Each of the dampers 54 is positioned within the conduit 52 and is aligned with the inlet 46 corresponding to an associated one of the nozzles 44. Each of the dampers 54 is selectively positioned between a closed position and an open position. Thus, each of the dampers 54 regulates a flow of air that is urged into the associated nozzle 44.

A pair of second motors 56 is provided. Each of the second motors 56 is coupled to an associated one of the dampers 54. Each of the second motors 56 positions the associated damper 54 at a selected point between the open position and the closed position. Each of the second motors 56 may comprise an electrical motor or the like.

The pair of propulsion units 34 includes a first propulsion unit 58 and a second propulsion unit 60. The nozzles 44 corresponding to the first propulsion unit 58 are spaced apart from each other and are distributed on the first lateral side 20 of the body 14. The nozzles 44 corresponding to the second propulsion unit 60 are spaced apart from each other and are distributed on the second lateral side 22 of the body 14. Each of the nozzles 44 corresponding to the first propulsion unit 58 and the second propulsion unit 60 are positioned adjacent to the bottom side 26 of the body 14.

A processor 62 is provided and the processor 62 is coupled to the body 14. The processor 62 is electrically coupled to the handlebars 30. Thus, the processor 62 receives steering information from the electronic sensor 32 in the handlebars 30. The processor 62 is electrically coupled each of the first motors 50, each of the second motors 56 and the jet engine 38 corresponding to each of the propulsion units 34. The processor 62 actuates each of the first motors 50 and the second motors 56 corresponding to the positioning of the handlebars 30.

The handlebars 30 may include a throttle 64 and the throttle 64 may be manipulated. The throttle 64 may be electrically coupled to the processor 62. Thus, the processor 62 controls a rotational speed of the jet engine 38. The rotational speed of the jet engine 38 corresponds to the amount of thrust generated by the jet engine 38.

A fuel tank 66 is coupled to the body 14 and the fuel tank 66 may contain a liquid fuel. The fuel tank 66 is fluidly coupled to the jet engine 38. Thus, the jet engine 38 may receive the liquid fuel from the fuel tank 66. A power supply 68 is coupled to the body 14 and the power supply 68 is electrically coupled to the processor 62. The power supply 68 comprises at least one battery 70.

In use, the user mounts the vehicle 12 and the user straddles the vehicle 12 in the convention of riding a motorcycle. The jet engine 38 corresponding to each of the propulsion units 34 is turned on. The outlet 48 corresponding to each of the nozzles 44 is directed downwardly and the throttle 64 is manipulated. Thus, each of the nozzles 44 directs air downwardly to lift the vehicle 12 upwardly from the support surface 36. The handlebars 20 are manipulated to steer the vehicle 12 in a selected direction. Thus, the outlet 48 corresponding to each of the nozzles 44 is positioned to urge the vehicle 12 in the selected direction. The bottom side 26 of the vehicle 12 rests on the support surface 36 when the jet engine 38 in each of the propulsion units 34 is turned off.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A hovercraft assembly comprising:
   a vehicle being configured to be driven, said vehicle including a body and a pair of handlebars, said body having a front end; and
   a pair of propulsion units, each of said propulsion units being coupled to said vehicle, each of said propulsion units being configured to urge air outwardly from said body thereby facilitating said vehicle to levitate with respect to support surface, each of said propulsion units being configured to direct the air in a selected direction with respect to said body thereby facilitating said propulsion units to urge said vehicle along the support surface in a selected direction, each of said propulsion units being operationally coupled to said handlebars such that said handlebars control operational parameters of each of said propulsion units, one of said propulsion units being a jet engine having an intake and an exhaust, said jet engine being positioned within said body such that intake extends through said front end wherein said intake is configured to draw air inwardly into said jet engine thereby facilitating said jet engine to urge the air outwardly through said exhaust.

2. The assembly according to claim 1, further comprising a pair of nozzles, each of said nozzles being movably coupled to said body, each of said nozzles having an inlet and an outlet.

3. The assembly according to claim 1, further comprising:
   a pair of nozzles, each of said nozzles having an inlet and an outlet; and
   a conduit being fluidly coupled between said jet engine and each of said nozzles wherein each of said nozzles is configured to have the air urged outwardly through said outlet thereby facilitating each of said nozzles to produce thrust.

4. The assembly according to claim 3, further comprising a pair of dampers, each of said dampers being hingedly coupled to said conduit, each of said dampers being positioned within said conduit and being aligned with said inlet corresponding to an associated one of said nozzles, each of said dampers being selectively positioned between a closed position and an open position wherein each of said dampers is configured to regulate a flow of air being urged into said associated nozzle.

5. The assembly according to claim 4, further comprising a pair of second motors, each of said second motors being coupled to an associated one of said dampers such that each of said second motors positions said associated damper at a selected point between said open position and said closed position.

6. The assembly according to claim 5, wherein said pair of propulsion units including a first propulsion unit and a second propulsion unit, said nozzles corresponding to said first propulsion unit being spaced apart from each other and being distributed on a first lateral side of said body, said nozzles corresponding to said second propulsion unit being spaced apart from each other and being distributed on a second lateral side of said body, each of said nozzles corresponding to said first propulsion unit and said second propulsion unit being positioned adjacent to a bottom side of said body.

7. The assembly according to claim 6, further comprising:
each of said propulsion units including a pair of first motors; and
a processor being coupled to said body, said processor being electrically coupled to said handlebars, said processor being electrically coupled each of said first motors, each of said second motors and said jet engine corresponding to each of said propulsion units.

8. The assembly according to claim 7, further comprising a power supply being coupled to said body, said power supply being electrically coupled to said processor, said power supply comprising at least one battery.

9. The assembly according to claim 1, further comprising a fuel tank being coupled to said body wherein said fuel tank is configured to contain a liquid fuel, said fuel tank being fluidly coupled to said jet engine wherein said jet engine is configured to receive the liquid fuel from said fuel tank.

10. A hovercraft assembly comprising:
a vehicle being configured to be driven, said vehicle including a body and a pair of handlebars, said body having a front end;
a pair of propulsion units, each of said propulsion units being coupled to said vehicle, each of said propulsion units being configured to urge air outwardly from said body thereby facilitating said vehicle to levitate with respect to support surface, each of said propulsion units being configured to direct the air in a selected direction with respect to said body thereby facilitating said propulsion units to urge said vehicle along the support surface in a selected direction, each of said propulsion units being operationally coupled to said handlebars such that said handlebars control operational parameters of each of said propulsion units;
a pair of nozzles, each of said nozzles being movably coupled to said body, each of said nozzles having an inlet and an outlet;
said body having a first lateral side and a second lateral side; and
a pair of first motors, each of said first motors being coupled to an associated one of said nozzles, each of said first motors selectively rotating said associated nozzle about an axis extending through said first lateral side and said second lateral side of said body having said outlet corresponding to said associated nozzle being directed in a selected direction such that each of said first motors facilitates forward and rearward directional control of said vehicle.

11. The assembly according to claim 10, wherein:
said body has a top side and a bottom side;
each of said first motors selectively rotates said associated nozzle about an axis extending through said top side and said bottom side of said body having said outlet corresponding to said associated nozzle being directed in a selected direction such that each of said first motors facilitates lateral directional control of said vehicle.

12. A hovercraft assembly comprising:
a vehicle being configured to be driven, said vehicle including a body, said body having a front end, a back end, a first lateral side, a second lateral side, a top side and a bottom side, said vehicle including a seat being positioned on said top side of said body wherein said seat is configured to support a user, said vehicle including a pair of handlebars being coupled to said top side wherein said pair of handlebars is configured to be gripped, said handlebars being positioned between said seat and said front end;
a pair of propulsion units, each of said propulsion units being coupled to said vehicle, each of said propulsion units being configured to urge air outwardly from said body thereby facilitating said vehicle to levitate with respect to support surface, each of said propulsion units being configured to direct the air in a selected direction with respect to said body thereby facilitating said propulsion units to urge said vehicle along the support surface in a selected direction, each of said propulsion units being operationally coupled to said handlebars such that said handlebars control operational parameters of each of said propulsion units, each of said propulsion units comprising:
a jet engine having an intake and an exhaust, said jet engine being positioned within said body such that intake extends through said front end wherein said intake is configured to draw air inwardly into said jet engine thereby facilitating said jet engine to urge the air outwardly through said exhaust,
a pair of nozzles, each of said nozzles being movably coupled to said body, each of said nozzles having an inlet and an outlet,
a pair of first motors, each of said first motors being coupled to an associated one of said nozzles, each of said first motors selectively rotating said associated nozzle about an axis extending through said first lateral side and said second lateral side of said body having said outlet corresponding to said associated nozzle being directed in a selected direction such that each of said first motors facilitates forward and rearward directional control of said vehicle, each of said first motors selectively rotating said associated nozzle about an axis extending through said top side and said bottom side of said body having said outlet corresponding to said associated nozzle being directed in a selected direction such that each of said first motors facilitates lateral directional control of said vehicle,
a conduit being fluidly coupled between said jet engine and each of said nozzles wherein each of said nozzles is configured to have the air urged outwardly through said outlet thereby facilitating each of said nozzles to produce thrust,
a pair of dampers, each of said dampers being hingedly coupled to said conduit, each of said dampers being positioned within said conduit and being aligned with said inlet corresponding to an associated one of said nozzles, each of said dampers being selectively positioned between a closed position and an open position wherein each of said dampers is configured to regulate a flow of air being urged into said associated nozzle,
a pair of second motors, each of said second motors being coupled to an associated one of said dampers such that each of said second motors positions said associated damper at a selected point between said open position and said closed position,
said pair of propulsion units including a first propulsion unit and a second propulsion unit, said nozzles corresponding to said first propulsion unit being spaced apart from each other and being distributed on said first lateral side of said body, said nozzles corresponding to said second propulsion unit being spaced apart from each other and being distributed on said second lateral side of said body, each of said nozzles corresponding to said first propulsion unit and said second propulsion unit being positioned adjacent to said bottom side of said body;

a processor being coupled to said body, said processor being electrically coupled to said handlebars, said processor being electrically coupled each of said first motors, each of said second motors and said jet engine corresponding to each of said propulsion units;

a fuel tank being coupled to said body wherein said fuel tank is configured to contain a liquid fuel, said fuel tank being fluidly coupled to said jet engine wherein said jet engine is configured to receive the liquid fuel from said fuel tank; and a power supply being coupled to said body, said power supply being electrically coupled to said processor, said power supply comprising at least one battery.

\* \* \* \* \*